(12) United States Patent
Wu et al.

(10) Patent No.: US 11,084,709 B2
(45) Date of Patent: Aug. 10, 2021

(54) METHOD, DEVICE AND SYSTEM FOR AUTOMATICALLY FUELING VEHICLE

(71) Applicant: TuSimple, Inc., San Diego, CA (US)

(72) Inventors: Nan Wu, Beijing (CN); He Zheng, Beijing (CN)

(73) Assignee: TUSIMPLE, INC., San Diego, CA (US)

( * ) Notice: Subject to any disclaimer, the term of this patent is extended or adjusted under 35 U.S.C. 154(b) by 243 days.

(21) Appl. No.: 16/035,662

(22) Filed: Jul. 15, 2018

(65) Prior Publication Data

US 2019/0023556 A1    Jan. 24, 2019

(30) Foreign Application Priority Data

Jul. 21, 2017   (CN) .......................... 201710601505.7

(51) Int. Cl.
*B67D 7/04* (2010.01)
*G01C 21/34* (2006.01)
(Continued)

(52) U.S. Cl.
CPC ............. *B67D 7/0401* (2013.01); *B67D 7/08* (2013.01); *G01C 21/3415* (2013.01);
(Continued)

(58) Field of Classification Search
CPC ......... B67D 7/0401; B67D 7/08; H04W 4/44; H04W 4/02; H04W 4/40; H04W 4/024;
(Continued)

(56) References Cited

U.S. PATENT DOCUMENTS 6,571,168 B1 * 5/2003 Murphy ................. G07C 5/085
340/438
6,777,904 B1    8/2004 Degner
(Continued)

FOREIGN PATENT DOCUMENTS

CN            105894669 A      8/2016

OTHER PUBLICATIONS

Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
(Continued)

*Primary Examiner* — Russell Frejd
(74) *Attorney, Agent, or Firm* — Paul Liu; Julie J. Muyco; Perkins Coie, LLP

(57) ABSTRACT

The present application provides a method, device and system for automatically fueling a vehicle. The method includes: judging, by a fueling control device of the vehicle, whether the vehicle needs to be filled with fuel; obtaining driving route information and vehicle status information of the vehicle in the case of determining that the vehicle needs to be filled with fuel; determining fuel amount to be filled according to the driving route information and the vehicle status information of the vehicle; sending a fueling request to a fueling management system; receiving a feedback message from the fueling management system, wherein the feedback message includes position information of a fueling device; and prompting the vehicle to obtain fuel offered by the fueling device indicated by the position information of the fueling device according to the fuel amount to be filled.

22 Claims, 3 Drawing Sheets

(51) Int. Cl.

| | | |
|---|---|---|
| *G05D 1/00* | (2006.01) | |
| *G08G 1/0968* | (2006.01) | |
| *G07C 5/08* | (2006.01) | |
| *H04W 4/40* | (2018.01) | |
| *G08G 1/0967* | (2006.01) | |
| *H04W 4/44* | (2018.01) | |
| *H04W 4/02* | (2018.01) | |
| *B67D 7/08* | (2010.01) | |
| *H04W 4/024* | (2018.01) | |
| *H04L 29/08* | (2006.01) | |
| *G08G 1/0962* | (2006.01) | |

(52) U.S. Cl.
CPC ....... *G01C 21/3469* (2013.01); *G05D 1/0088* (2013.01); *G07C 5/0841* (2013.01); *G08G 1/0967* (2013.01); *G08G 1/0968* (2013.01); *H04W 4/02* (2013.01); *H04W 4/40* (2018.02); *H04W 4/44* (2018.02); *G05D 2201/0213* (2013.01); *G08G 1/09626* (2013.01); *G08G 1/096844* (2013.01); *H04L 67/125* (2013.01); *H04W 4/024* (2018.02)

(58) Field of Classification Search
CPC ............ G01C 21/3469; G01C 21/3415; G05D 1/0088; G05D 2201/0213; G08G 1/0968; G08G 1/0967; G08G 1/09626; G08G 1/096844; G07C 5/0841; H04L 67/125
See application file for complete search history.

(56) References Cited

U.S. PATENT DOCUMENTS

| | | | |
|---|---|---|---|
| 7,103,460 | B1 | 9/2006 | Breed |
| 7,783,403 | B2 | 8/2010 | Breed |
| 8,412,449 | B2 | 4/2013 | Trepagnier |
| 8,788,134 | B1 | 7/2014 | Litkouhi |
| 8,965,621 | B1 | 2/2015 | Urmson |
| 9,002,632 | B1 | 4/2015 | Emigh |
| 9,111,444 | B2 | 8/2015 | Kaganovich |
| 9,134,402 | B2 | 9/2015 | Sebastian |
| 9,248,835 | B2 | 2/2016 | Tanzmeister |
| 9,315,192 | B1 | 4/2016 | Zhu |
| 9,317,033 | B2 | 4/2016 | Ibanez-guzman |
| 9,342,074 | B2 | 5/2016 | Dolgov |
| 9,399,397 | B2 | 7/2016 | Mizutani |
| 9,438,878 | B2 | 9/2016 | Niebla |
| 9,476,970 | B1 | 10/2016 | Fairfield |
| 9,535,423 | B1 | 1/2017 | Debreczeni |
| 9,568,915 | B1 | 2/2017 | Bemtorp |
| 9,587,952 | B1 | 3/2017 | Slusar |
| 9,720,418 | B2 | 8/2017 | Stenneth |
| 9,723,097 | B2 | 8/2017 | Harris |
| 9,723,099 | B2 | 8/2017 | Chen |
| 9,738,280 | B2 | 8/2017 | Rayes |
| 9,746,550 | B2 | 8/2017 | Nath |
| 2008/0249667 | A1 | 10/2008 | Horvitz |
| 2009/0040054 | A1 | 2/2009 | Wang |
| 2010/0049397 | A1 | 2/2010 | Lin |
| 2014/0263629 | A1* | 9/2014 | McQuade ............ G06Q 20/401 235/381 |
| 2015/0073629 | A1* | 3/2015 | Kraeling ................. B61C 17/02 701/19 |
| 2015/0348335 | A1* | 12/2015 | Ramanujam ......... G05D 1/0088 701/23 |
| 2016/0321381 | A1 | 11/2016 | English |
| 2016/0375907 | A1 | 12/2016 | Erban |
| 2017/0193502 | A1* | 7/2017 | McQuade ............ B67D 7/0401 |
| 2017/0316635 | A1 | 11/2017 | Guo et al. |
| 2019/0023557 | A1* | 1/2019 | Wu ...................... B67D 7/0401 |
| 2019/0178664 | A1* | 6/2019 | Dudar .................... G01C 21/34 |

OTHER PUBLICATIONS

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.

Kyoungho Ahn, Hesham Rakha, "The Effects of Route Choice Decisions on Vehicle Energy Consumption and Emissions", Virginia Tech Transportation Institute, Blacksburg, VA 24061, date unknown.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.

Schroff, Florian, Dmitry Kalenichenko, James Philbin, (Google), "FaceNet: A Unified Embedding for Face Recognition and Clustering", CVPR 2015.

Dai, Jifeng, Kaiming He, Jian Sun, (Microsoft Research), "Instance-aware Semantic Segmentation via Multi-task Network Cascades", CVPR 2016.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.

Tian Li, "Proposal Free Instance Segmentation Based on Instance-aware Metric", Department of Computer Science, Cranberry-Lemon University, Pittsburgh, PA., date unknown.

Mohammad Norouzi, David J. Fleet, Ruslan Salakhutdinov, "Hamming Distance Metric Learning", Departments of Computer Science and Statistics, University of Toronto, date unknown.

Jain, Suyong Dutt. Grauman, Kristen, "Active Image Segmentation Propagation", In Proceedings of the IEEE Conference on Computer Vision and Pattern Recognition (CVPR), Las Vegas, Jun. 2016.

MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.

Kendall, Alex, Gal, Yarin, "What Uncertainties Do We Need in Bayesian Deep Learning for Computer Vision", arXiv:1703.04977v1 [cs.CV] Mar. 15, 2017.

Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.

Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.

Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.

P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.

Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban

(56) References Cited

OTHER PUBLICATIONS

Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
First Office Action in Chinese Patent Application No. 20171061505.7 dated Jun. 28, 2018. Machine translation provided.
Second Office Action in Chinese Patent Application No. 20171061505.7 dated Aug. 28, 2018. Machine translation provided.
Third Office Action in Chinese Patent Application No. 20171061505.7 dated Sep. 28, 2018. Machine translation provided.

\* cited by examiner

METHOD, DEVICE AND SYSTEM FOR AUTOMATICALLY FUELING VEHICLE

CROSS-REFERENCES TO RELATED APPLICATIONS

The present application claims the priority from Chinese Patent Application No. 201710601505.7, filed with the Chinese Patent Office on Jul. 21, 2017 and entitled "METHOD, DEVICE AND SYSTEM FOR AUTOMATICALLY FUELING VEHICLE", which is hereby incorporated by reference in its entirety.

FIELD

The application relates to the intelligent transportation field and particularly to a method, device and system for automatically fueling a vehicle.

BACKGROUND

Generally the fuel consumption of a vehicle is proportional to the weight of the vehicle. The user generally fuel the vehicle according to experience, and cannot control the weight of the vehicle effectively and achieve the reasonable fuel consumption. For example, in the event that the vehicle is filled with too much fuel, the self-weight of the vehicle may increase, which causes the increased fuel consumption; and in the event that the vehicle is filled with too less fuel, the vehicle may be unable to reach to the destination.

BRIEF SUMMARY

The application provides a method, device and system for automatically fueling a vehicle.

According to an aspect of the present application, some embodiments provide a method for automatically fueling a vehicle, which includes: judging, by a fueling control device of the vehicle, whether the vehicle needs to be filled with fuel; obtaining driving route information and vehicle status information of the vehicle in the case of determining that the vehicle needs to be filled with fuel; determining fuel amount to be filled according to the driving route information and the vehicle status information of the vehicle; obtaining a current position of the vehicle; sending a fueling request to a fueling management system, wherein the fueling request carries an identifier of the vehicle, information of the fuel amount to be filled, and information of the current position of the vehicle; receiving a feedback message from the fueling management system, wherein the feedback message includes position information of a fueling device; and prompting the vehicle to obtain fuel offered by the fueling device indicated by the position information of the fueling device according to the fuel amount to be filled.

According to another aspect of the present application, some embodiments provide a method for automatically fueling a vehicle, which includes: receiving, by a fueling management system, a fueling request from the vehicle, wherein the fueling request comprises an identifier of the vehicle, information of fuel amount to be filled, and information of a current position of the vehicle; allocating a fueling device which conforms to a preset position rule to the vehicle according to the information of the current position of the vehicle and the preset position rule; sending a feedback message carrying position information of the fueling device to the vehicle; and sending the identifier of the vehicle and the information of the fuel amount to be filled to the fueling device so that the fueling device offers fuel to the vehicle indicated by the identifier of the vehicle according to the information of the fuel amount to be filled.

According to another aspect of the present application, some embodiments provide a device for automatically fueling a vehicle, which locates in the vehicle and includes a memory, a processor and a transceiver; the memory is configured to store at least one machine executable instruction; the processor is configured to execute the instruction stored in the memory to: judge whether the vehicle needs to be filled with fuel; obtain driving route information and vehicle status information of the vehicle in the case of determining that the vehicle needs to be filled with fuel; determine fuel amount to be filled according to the driving route information and the vehicle status information of the vehicle; obtain a current position of the vehicle; send, through the transceiver, a fueling request to a fueling management system, wherein the fueling request carries an identifier of the vehicle, information of the fuel amount to be filled, and information of the current position of the vehicle; receive, through the transceiver, a feedback message from the fueling management system, wherein the feedback message includes position information of a fueling device; and prompt the vehicle to obtain fuel offered by the fueling device indicated by the position information of the fueling device according to the fuel amount to be filled; and the transceiver is configured to receive and send information according to invoking by the processor.

According to another aspect of the present application, some embodiments provide a device for automatically fueling a vehicle, which locates at a network side and includes a memory, a processor and a transceiver; the memory is configured to store at least one machine executable instruction; the processor is configured to execute the instruction stored in the memory to: receive, through the transceiver, a fueling request from the vehicle, wherein the fueling request includes an identifier of the vehicle, information of fuel amount to be filled, and information of a current position of the vehicle; allocate a fueling device which conforms to a preset position rule to the vehicle according to the information of the current position of the vehicle and the preset position rule; send, through the transceiver, a feedback message carrying position information of the fueling device to the vehicle; and send, through the transceiver, the identifier of the vehicle and the information of the fuel amount to be filled to the fueling device so that the fueling device offers fuel to the vehicle indicated by the identifier of the vehicle according to the information of the fuel amount to be filled; and the transceiver is configured to receive and send information according to invoking by the processor.

According to another aspect of the present application, some embodiments provide a system for automatically fueling a vehicle, which includes a fueling control device in the vehicle, a fueling management system at a network side and a fueling device; the fueling control device of the vehicle is configured to judge whether the vehicle needs to be filled with fuel; obtain driving route information and vehicle status information of the vehicle in the case of determining that the vehicle needs to be filled with fuel; determine fuel amount to be filled according to the driving route information and the vehicle status information of the vehicle; obtain a current position of the vehicle; send a fueling request to the fueling management system, wherein the fueling request carries an identifier of the vehicle, information of the fuel amount to be filled, and information of the current position of the vehicle; receive a feedback message from the fueling management system, wherein the feedback message includes position information of the fueling device; and prompt the vehicle to obtain fuel offered by the fueling device indicated by the position information of the fueling device according to the fuel amount to be filled; the fueling management system is configured to receive the fueling request from the vehicle, where the fueling request includes the information of the fuel amount to be filled and the information of the current position of the vehicle; allocate the fueling device which conforms to a preset position rule to the vehicle according to the information of the current position of the vehicle and the preset position rule; send a feedback message carrying information of the fueling device to the vehicle; and send the identifier of the vehicle and the information of the fuel amount to be filled to the fueling device so that the fueling device offers fuel to the vehicle indicated by the identifier of the vehicle according to the information of the fuel amount to be filled; and the fueling device is configured to receive the identifier of the vehicle and the information of the fuel amount to be filled from the fueling management system; and offer the fuel corresponding to the fuel amount to be filled to the vehicle indicated by the identifier of the vehicle.

BRIEF DESCRIPTION OF THE DRAWINGS

The accompanying drawings are used to provide the further understanding of the invention and constitute a part of the specification, and serve to explain the invention together with the embodiments of the invention but not limit the invention.

DETAILED DESCRIPTION OF THE EMBODIMENTS

In order to make those skilled in the art better understand the technical solution in the invention, the technical solution in the embodiments of the invention will be described clearly and completely below in combination with the accompanying drawings in the embodiments of the invention. Obviously the described embodiments are just a part of the embodiments of the invention but not all the embodiments. Based upon the embodiments of the invention, all of other embodiments obtained by those ordinary skilled in the art without creative work should pertain to the protection scope of the invention.

For the problem in the prior art that an effective and automatically fueling solution is absent, the reasonable fueling for the vehicle cannot be achieved and the fuel consumption of the vehicle cannot be reduced effectively, the embodiments of the application proposes an automatically fueling solution of the vehicle. According to this solution, in the case of determining that the vehicle needs to be filled with fuel, the fueling control device of the vehicle obtains the driving route information and the vehicle status information of the vehicle, determines the fuel amount required by the vehicle to drive in this driving route according to the driving route information and the vehicle status information of the vehicle, and sends the determined information of the fuel amount to be filled and information of the current position of the vehicle to the fueling management system at the network side; the fueling management system allocates a fueling device to the vehicle according to the current position of the vehicle, and sends the vehicle identifier and the information of the fuel amount to be filled to the allocated fueling device; and the fueling device offers the corresponding fuel to the vehicle indicated by the vehicle identifier according to the information of the fuel amount to be filled. The solution proposed by the application can plan the fuel amount to be filled for the vehicle automatically and effectively, and offer the corresponding fuel to the vehicle, so as to solve the problem that the filled fuel amount of the vehicle cannot be planned automatically, reasonably and effectively in the prior art.

Figure 1:
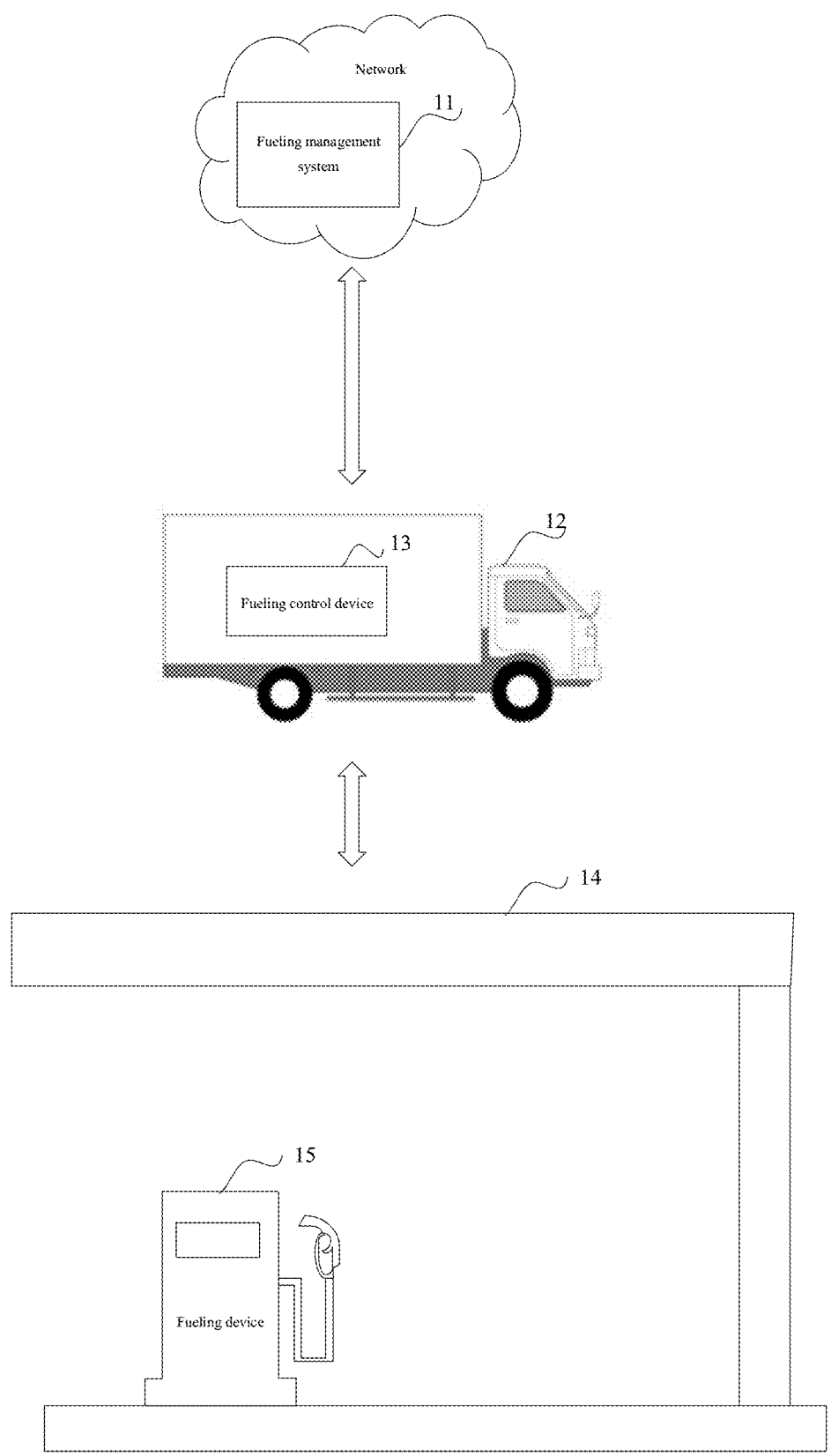
FIG. 1 is a schematic diagram of a system for automatically fueling a vehicle provided by some embodiments of the present application.

According to one aspect of the present application, a system for automatically fueling a vehicle is provided, as shown in FIG. 1, which includes a fueling management system 11 located at the network side, a vehicle 12, and a fueling device 15 in a fueling station 14.

Where, the fueling management system 11 could be an independent control system, or could be deployed in combination with the existing car rental system, with the existing fueling station management system, with the existing intelligent bus management system, with the existing logistics management system, or with the highway port operating center providing service for the long-distance transport in the prior art; that is, the fueling management system 11 provided by the present application can be deployed in combination with any system of managing the vehicles intelligently. In order to be describe clearly the automatically fueling system provided by the present application, the fueling management system is deployed alone in FIG. 1.

The fueling management system 11 could be a fixed device, or could be a movable or portable device.

The vehicle 12 could be any vehicle which needs to be filled with fuel, such as the vehicle filled with gasoline, diesel fuel, alcohol, liquefied gas or hydrogen, or the fuel cell vehicle. The vehicle 12 could be a vehicle having the manual drive mode, automatic drive mode, or unmanned mode.

A fueling control device 13 could be included in the vehicle 12. The fueling control device 13 includes a memory and a processor. This device 13 could be configured alone, or could be configured in the navigation device of the vehicle, in the Vehicle to X (V2X) device of the vehicle, or in the Human Machine Interface (HMI) device of the vehicle; that is, the fueling control device provided by the present application could be configured in a control device, which locates in the vehicle and includes a structure of memory and processor.

The fueling control device 13 further includes the function of communicating with other devices or network resources, for example, the fueling control device 13 can communicate with the corresponding client application in the mobile terminal of the user, where the client has a part of or all the functions of the fueling control device 13. In an embodiment, the client can send the information input by the user to the fueling control device 13; in another embodiment, the client processes the information input by the user and sends the processed result to the fueling control device 13; in yet another embodiment, the client processes the data or instruction from the fueling control device 13 and feeds back the corresponding processed result to the fueling control device 13.

Similarly, the fueling control device 13 can further communicate with a network side device which may also include the corresponding server. The fueling control device 13 can send the data or request to the network side device, and the network side device or the server in the network side device processes the data or instruction accordingly and feeds back the processed result to the fueling control device 13.

In the case that the fueling control device 13 is deployed alone, the fueling control device 13 could include a transceiver with wired or wireless communication function, and communicate with other devices and sources through the transceiver. In the case that the fueling control device 13 is deployed in combination with another device, the fueling control device 13 can has an interface with the communication function, and communicate with other devices in the vehicle via the interface, or invoke the communication device in the vehicle 12 via the interface to communicate with the devices/network resources external to the vehicle 12.

The fueling device 15 is generally a fueling machine or another device or equipment capable of offering the fuel. The fueling device 15 has the communication function, where it can receive the data and/or instruction from the fueling management system 11 and/or the fueling control device 13 in the vehicle 12, process the data and/or instruction, and feedback the corresponding processing result to the fueling management system 11 and/or the fueling control device 13 in the vehicle 12.

The operating principle of the system as shown in FIG. 1 includes:

the fueling control device 13 of the vehicle 12 judges whether the vehicle 12 needs to be filled with fuel; obtains the driving route information and vehicle status information of the vehicle 12 in the case of determining that the vehicle 12 needs to be filled with fuel; determines the fuel amount to be filled according to the driving route information and the vehicle status information of the vehicle 12; determines the current position of the vehicle 12; sends a fueling request to the fueling management system 11, where the fueling request carries an identifier of the vehicle 12, the information of the fuel amount to be filled, and the information of the current position of the vehicle 12; receives a feedback message from the fueling management system 11, where the feedback message includes the position information of the fueling device 15; and prompts the vehicle 12 to obtain the fuel offered by the fueling device 15 indicated by the position information of the fueling device according to the fuel amount to be filled;

the fueling management system 11 receives the fueling request from the vehicle 12, where the fueling request includes the identifier of the vehicle 12, the information of the fuel amount to be filled, and the information of the current position of the vehicle 12; allocates the fueling device which conforms to a preset position rule to the vehicle 12 according to the information of the current position of the vehicle 12 and the preset position rule; sends the feedback message carrying the information of the fueling device to the vehicle 12; and sends the identifier of the vehicle and the information of the fuel amount to be filled to the fueling device 15 so that the fueling device 15 offers the fuel to the vehicle 12 indicated by the identifier of the vehicle according to the information of the fuel amount to be filled;

the fueling device 15 receives the identifier of the vehicle and the information of the fuel amount to be filled from the fueling management system 11; and offers the fuel corresponding to the fuel amount to be filled to the vehicle 12 indicated by the identifier of the vehicle.

The operating principles of the fueling control device 13 of the vehicle 12 and the fueling management system 11 at the network side will be illustrated below respectively.

Figure 2:
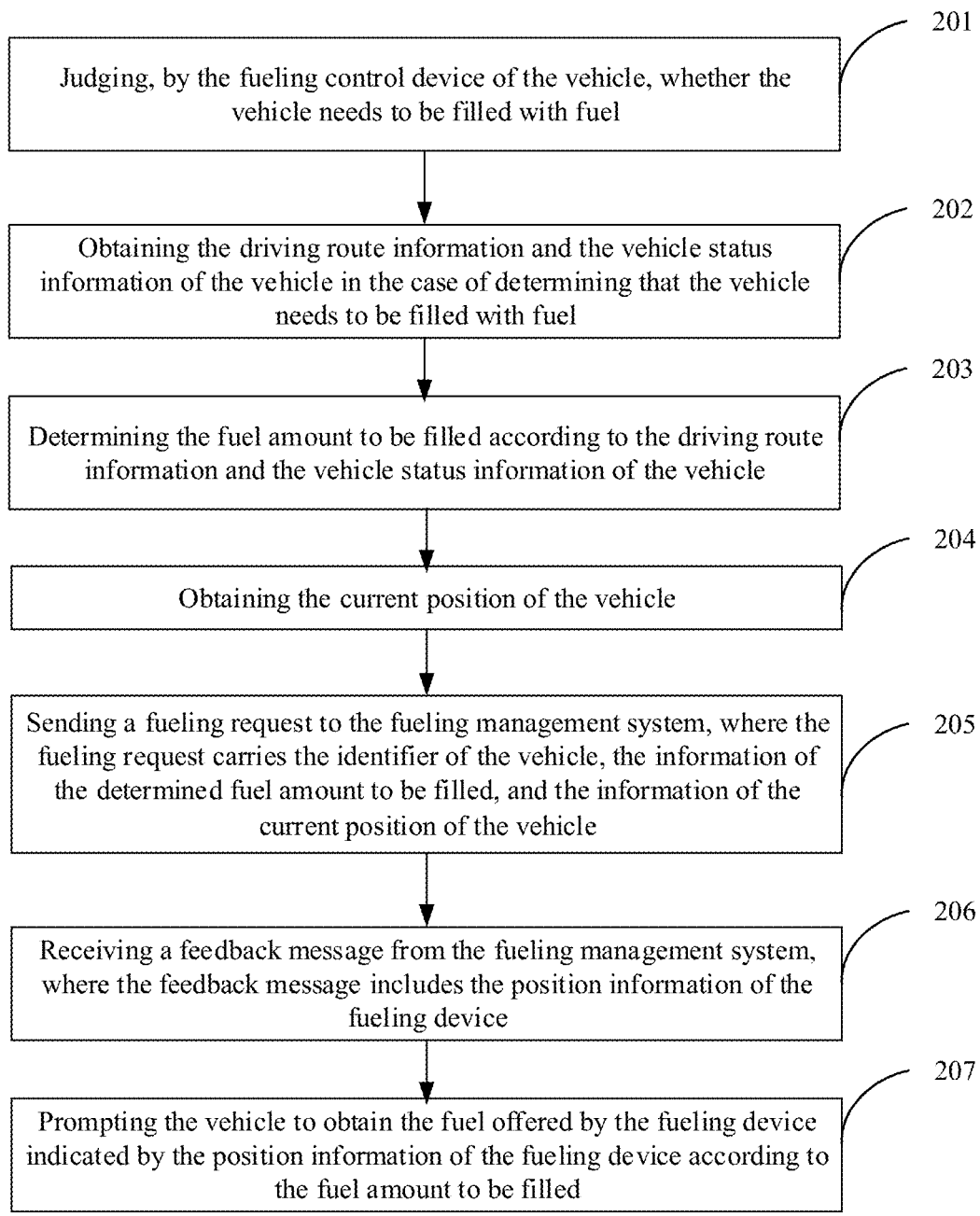
FIG. 2 is a flow chart of a method for automatically fueling a vehicle provided by some embodiments of the present application.

FIG. 2 shows an operating process of the automatically fueling method provided by the present application. The process shows the operating principle of the fueling control device 13 in the vehicle 12, which includes:

Step 201: judging, by the fueling control device of the vehicle, whether the vehicle needs to be filled with fuel.

The fueling control device can judge whether the vehicle needs to be filled with fuel in various ways. In an embodiment, it is determined that the vehicle needs to be filled with fuel in the case that a liquid level signal is received from an On-board network of the vehicle, and the liquid level signal indicates that the liquid level of the fuel tank of the vehicle is lower than the predetermined liquid level, where the liquid level signal is sent from a liquid level sensor in the fuel tank of the vehicle to the On-board network.

In another embodiment, it is determined that the vehicle needs to be filled with fuel in the case that a loading signal is received from the On-board network and the load signal indicates that the loading weight of the vehicle exceeds the predetermined deadweight, where the loading signal of the On-board network is sent from the load measuring sensor of the vehicle to the On-board network.

In yet another embodiment, it can also be determined that the vehicle needs to be filled with fuel in the case of receiving a fueling indication from the outside of the vehicle, e.g., receiving the fueling indication input by the user via the human machine interface of the vehicle, receiving the fueling indication from the client of the mobile terminal of the user, or receiving the fueling indication from the network side terminal.

In other embodiments of the present application, other ways in which it is judged whether the vehicle needs to be filled with fuel are included, and will not be enumerated here.

Step 202: obtaining the driving route information and the vehicle status information of the vehicle in the case of determining that the vehicle needs to be filled with fuel.

The fueling control device can obtain the vehicle status information from the On-board network, where the vehicle status information at least includes: the average fuel consumption per 100 kilometers, the current weight and the filled fuel amount of the vehicle, wherein the average fuel consumption per 100 kilometers of the vehicle can be determined according to the empirical value of the historical data, according to the theoretical value, or according to both the empirical value and the theoretical value. The fueling control device can also obtain the vehicle status information in other ways, and a detailed description thereof will be omitted here.

The fueling control device can obtain the driving route information of the vehicle in various ways. In an embodiment, the fueling control device obtains the driving route information of the vehicle in the following way (the following processing procedure is not shown in the figures):

Step 2021: determining the current position of the vehicle, where the fueling control device can obtain the current position of the vehicle from the GPS positioning device or can obtain the current position of the vehicle from the navigation device.

Step 2022: judging whether the current position of the vehicle is included on the prestored driving route; that is, judging whether the current position of the vehicle is roughly a point on the prestored driving route, i.e., judging whether the current position of the vehicle is in the preset range at two sides of the driving route, and determining the current position of the vehicle is included on the prestored driving route when it is in the preset range.

The prestored driving route could be the route along which the vehicle has driven and which is recorded. For certain vehicles such as public traffic vehicles, transportation vehicles, private cars for daily commuting and the like, they repeat driving along one or more certain routes. When the fueling control device judges whether the vehicle needs to be filled with fuel, it can obtain the information relevant to the determined driving route.

Step 2023: in the case that the current position of the vehicle is included on the prestored driving route, and if the current position of the vehicle is at one of two ends of the prestored driving route, determining the prestored driving route is the obtained driving route; if the current position of the vehicle is not at one of two ends of the prestored driving route, determining a route between the current position of the vehicle and an end of the prestored driving route in the driving direction of the vehicle as the obtained driving route according to the driving direction of the vehicle; wherein the current position of the vehicle is at one of two ends of the prestored driving route, including: the current position of the vehicle is roughly at one of two ends, that is, when the current position of the vehicle is in a preset range of one end, the current position of the vehicle is determined to be at one end, where the preset range can be determined according to the practical application scenario. In an example, if the end is a scheduling station of a car rental operator, the whole scheduling station or the area in a certain range around the scheduling station can be determined as the preset range; In another example, if the end is a parking lot, the parking lot or the area in a certain range around the parking lot can be determined as the preset range. The process proceeds to step 203.

Step 2024: in the case that the current position of the vehicle is not included on the prestored driving route, obtaining the driving route information of the vehicle from external resources. The process proceeds to step 203.

In an embodiment, the fueling control device can prompt the user to input the driving route information, and receive the driving route information input by the user via the on-board HMI device or the on-board navigation device.

In another embodiment, the fueling control device can send a message requesting to obtain the driving route information to a client of a mobile terminal of the user, and receive the driving route information from the client of the mobile terminal of the user.

In yet another embodiment, the fueling control device can send a message requesting to obtain the driving route information to a network terminal, and receive the driving route information from the network terminal.

Step 203: determining the fuel amount to be filled according to the driving route information and the vehicle status information of the vehicle.

The fueling control device can determine the fuel amount to be filled according to the following processing procedure (which is not shown in the figures):

Step 2031: determining the length of the driving route.

When determining the fuel amount to be filled, firstly the required fuel amount of the vehicle can be determined, and then the fuel amount to be filled is determined according to the required fuel amount and the filled fuel amount of the vehicle, wherein the process of determining the required fuel amount can depend on different application scenarios and different factors, which will be illustrated below:

Step 2032*a*: determining the required fuel amount according to a function relationship among the average fuel consumption per 100 kilometers of the vehicle, the current weight of the vehicle and the length of the driving route.

This function relationship can be expressed as $y=f(r, s, t)$, wherein y is the required fuel amount, r is the average fuel consumption per 100 kilometers of the vehicle, s is the current weight of the vehicle, and t is the length of the driving route.

In another embodiment of the present application, the fueling control device further determines the driving time of the vehicle, where the driving time is the current driving time of the vehicle and can be obtained from the inside of the vehicle.

Then determining the required fuel amount includes:

Step 2032*b*: determining the required fuel amount according to a function relationship among the average fuel consumption per 100 kilometers of the vehicle, the current weight of the vehicle, the length of the driving route and the driving time.

This function relationship can be expressed as $y=f(r, s, t, u)$, wherein r is the average fuel consumption per 100 kilometers of the vehicle, s is the current weight of the vehicle, t is the length of the driving route, and u is the driving time. In some application scenarios, for example, for the private cars for commuting or public traffic vehicles, the factor of the driving time should be considered when determining the required fuel amount, where the required fuel amount in the rush hour is more than that in other period.

In another embodiment of the present application, it is further required to obtain the weather condition information. The weather condition information can be obtained from a weather application in the mobile device of the user, or can be obtained from a network resource including a web server or a Vehicle to X (V2X) device. The specific obtaining operation can includes: the fueling control device sends a request for obtaining the weather condition to the client in the mobile device, and the client obtains the weather condition information of the weather application in the mobile terminal and sends the obtained weather condition information to the fueling control device in the vehicle; or the fueling control device sends a request for obtaining the weather condition to the network resource (e.g., weather forecast website or another network resource), and the network resource sends the weather condition information to the fueling control device.

Then determining the required fuel amount includes:

Step 2032*c*: determining the required fuel amount according to a function relationship among the average fuel consumption per 100 kilometers of the vehicle, the current weight of the vehicle, the length of the driving route and the weather condition.

This function relationship can be expressed as $y=f(r, s, t, u)$, wherein y is the required fuel amount, r is the average fuel consumption per 100 kilometers of the vehicle, s is the current weight of the vehicle, t is the length of the driving route, and u is the parameter representing the weather condition. The reference of the weather condition is preset. In some application scenarios, for example, the rainstorm weather takes place frequently in summer, and the snowy weather takes place frequently in winter. In such weather environment, the vehicle generally needs to drive slowly to ensure the safety, and the weather factor should be considered when determining the required fuel amount.

In another embodiment of the present application, it is further required to obtain the information of road status of the driving route, which includes at least one of: road speed limit information, road traffic control information, road closure information, road congestion information. The specific obtaining operation can includes: the fueling control device obtains the information of the road status of the driving route from the navigation device of the vehicle; or the fueling control device can send a request for obtaining the information of the road status of the driving route to the client in the mobile device, and the client obtains the information of the road status of the driving route in the mobile terminal such as the navigation application, and sends the obtained information of the road status of the driving route to the fueling control device in the vehicle; or the fueling control device sends a request for obtaining the information of the road status of the driving route to the network resource (e.g., road status broadcast or another network resource), and the network resource sends the information of the road status of the driving route to the fueling control device.

Then determining the required fuel amount includes:

Step 2032d: determining the required fuel amount according to a function relationship among the average fuel consumption per 100 kilometers of the vehicle, the current weight of the vehicle, the length of the driving route and the road status of the driving route.

This function relationship can be expressed as $y=f(r, s, t, u)$, wherein y is the required fuel amount, r is the average fuel consumption per 100 kilometers of the vehicle, s is the current weight of the vehicle, t is the length of the driving route, and u is the parameter representing the road status. In some application scenarios, most of the vehicles drive slowly when the road is congested, thus the required fuel amount is more than that when the road is clear, and then the road status should be considered when determining the required fuel amount.

In another embodiment of the present application, the vehicle status information further includes: the information of the maximum load of the vehicle; then the process of determining the required fuel amount includes:

Step 2032e: determining the required fuel amount according to a function relationship among the average fuel consumption per 100 kilometers of the vehicle, the current weight of the vehicle, the maximum load of the vehicle and the length of the driving route.

This function relationship can be expressed as $y=f(r, s, t, u)$, wherein y is the required fuel amount, r is the average fuel consumption per 100 kilometers of the vehicle, s is the current weight of the vehicle, t is the length of the driving route, and u is the maximum load of the vehicle. In some application scenarios, for example, as for the freight vehicle or public traffic vehicle, the maximum load condition of the vehicle should be considered to ensure the transportation mission can be accomplished successfully. Thus the maximum load condition of the vehicle needs to be considered when determining the required fuel amount.

In an actual application scenario, one of the function relationships in the steps 2032a to 2032e can be selected according to the actual demand, or the above function relationships can be combined, or new variables and/or parameters can be introduced into the function relationships, and a detailed description thereof will be omitted here.

Step 2033: determining the fuel amount to be filled according to the determined required fuel amount and the filled fuel amount of the vehicle; where the determined required fuel amount can be compared with the filled fuel amount of the vehicle, and the fuel amount to be filled is determined according to the comparison result.

In some embodiments of the present application, if at least one prestored driving route is obtained in the above step 2023, the required fuel amount of each driving route can be determined respectively according to the above processing procedure and the determined result is prompted to the driver, and the fuel amount to be filled corresponding to the route selected by the user is taken as the determined fuel amount to be filled.

Step 204: obtaining the current position of the vehicle.

Step 205: sending a fueling request to the fueling management system, where the fueling request carries the identifier of the vehicle, the information of the determined fuel amount to be filled, and the information of the current position of the vehicle.

Here the identifier of the vehicle can be the Vehicle Identification Number (VIN) of the vehicle; or can be the application identification number allocated by the fueling management system to the vehicle in advance, where the application identification number can be the identity identification number or authentication identification number; or can be a combination of the VIN and the application identification number.

Step 206: receiving a feedback message from the fueling management system, where the feedback message includes the position information of the fueling device. The position information of the fueling device is the geographical position information of the fueling device, e.g., the information of the position located by the GPS, or can be the position information of the fueling device within the fueling station, e.g., the fueling device in the position A within the fueling station.

Step 207: prompting the vehicle to obtain the fuel offered by the fueling device indicated by the position information of the fueling device according to the fuel amount to be filled.

According to the above procedure, the fueling control device of the vehicle can automatically and effectively determine the fuel amount required by the vehicle, obtain the position of the fueling device allocated by the fueling management system and obtain the fuel offered by the fueling device, so as to solve the problem that the vehicle cannot be filled with fuel automatically and effectively in the prior art.

In some other embodiments of the present application, the function relationships in the steps 2032a to 2032e can be updated periodically, where the process of updating the function relationships includes (the following processing procedure is not shown in the figures):

Step 2081: determining the actual fuel consumption after each fueling in a preset update cycle, where the actual fuel consumption can be determined according to the signal feedback from the liquid level sensor of the fuel tank;

Step 2082: comparing the required fuel amount determined each time with the actual fuel consumption;

Step 2083: updating the function relationships for determining the required fuel amount according to the comparison result.

The function relationships for determining the required fuel amount are updated according to the actual fuel consumption condition, and the function relationships can be optimized, so that the required fuel amount which is more accurate is determined according to the updated function relationships subsequently.

In some other embodiments of the present application, the fueling control device of the vehicle receives a payment message from the fueling management system, and makes a payment according to the payment message.

The operating principle of the fueling control device of the vehicle is illustrated above, and the operating principle of the fueling management system at the network side will be illustrated below.

Figure 3:
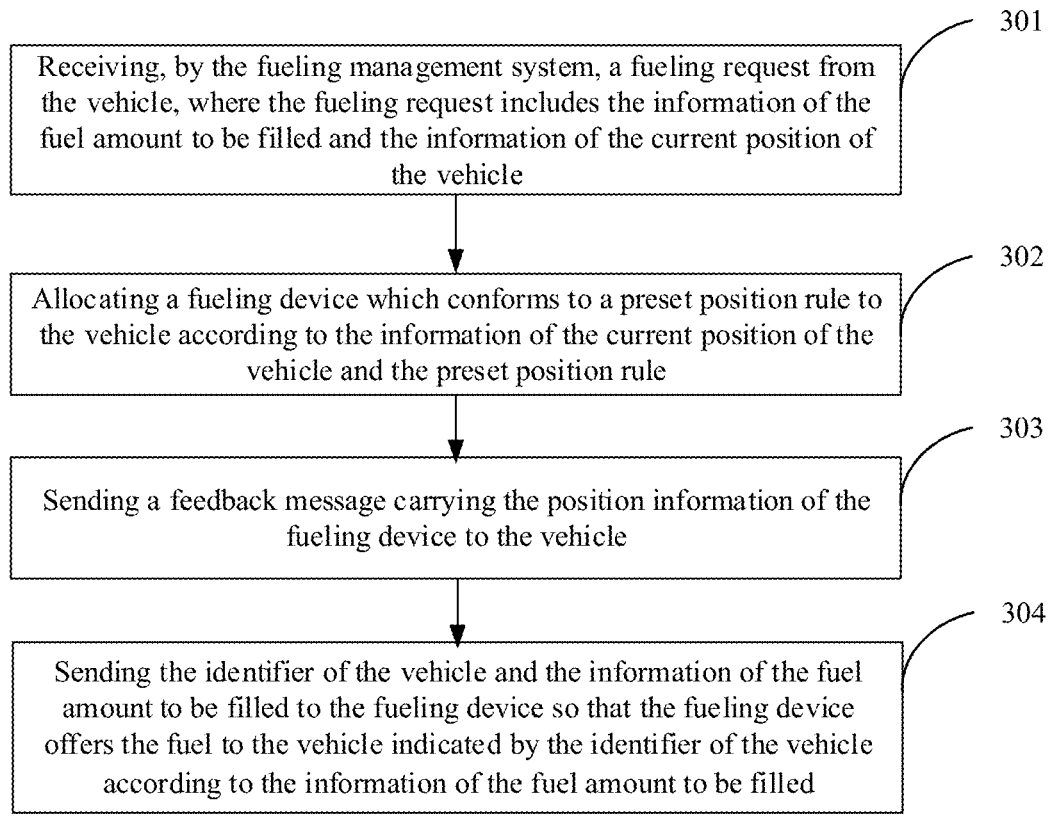
FIG. 3 is another flow chart of a method for automatically fueling a vehicle provided by some embodiments of the present application.

FIG. 3 shows a processing flow of an automatically fueling method of a vehicle provided by the present application, i.e., the operating principle of the fueling management system at the network side. This processing flow includes:

Step 301: receiving, by the fueling management system, a fueling request from the vehicle, where the fueling request includes the information of the fuel amount to be filled and the information of the current position of the vehicle.

Step 302: allocating a fueling device which conforms to a preset position rule to the vehicle according to the information of the current position of the vehicle and the preset position rule.

The fueling management system obtains the prestored positions of at least one fueling device, and allocates the fueling device which conforms to the preset position rule to the vehicle.

Here the preset position rule includes: a fueling device closest to the current position of the vehicle; or any one of at least one fueling device of which the distance from the current position of the vehicle is a preset distance; or a fueling device of a preset operator closest to the current position of the vehicle. In a specific application scenario, the position rule can be set according to different requirements, and a detailed description thereof will be omitted here.

Step 303: sending a feedback message carrying the position information of the fueling device to the vehicle.

Step 304: sending the identifier of the vehicle and the information of the fuel amount to be filled to the fueling device so that the fueling device offers the fuel to the vehicle indicated by the identifier of the vehicle according to the information of the fuel amount to be filled.

According to the above processing procedure, the fueling management system provided by the present application allocates the fueling device to the vehicle according to the current position of the vehicle, sends the position information of the allocated fueling device to the vehicle, and sends the information of the fuel amount to be filled to the fueling device, so as to achieve the automatically fueling of the vehicle automatically and effectively.

In another embodiment of the present application, in the step 302, the fueling management system further obtains the dynamic operation condition information of each of the at least one fueling device, where the dynamic operation condition information includes the fueling queue length of the fueling device.

Then the fueling management system allocates the fueling device to the vehicle having the automatically fueling system, which includes: allocating a fueling device which conforms to the preset position rule and of which the fueling queue length is less than the preset fueling queue length to the vehicle, i.e., allocating the fueling device which simultaneously meets these two conditions to the vehicle. For example, a fueling device which conforms to the preset position rule is determined, and when the fueling queue length of the fueling device is greater than the preset fueling queue length, the fueling device is excluded and another fueling device is selected and allocated; further, the fueling management system can further determine the serial number of the vehicle in the fueling queue of the allocated fueling device and the waiting time, and the feedback message further includes: the identifier of the fueling device, the serial number of the fueling queue, and the waiting time.

In a specific application scenario, the fueling device can be allocated to the vehicle according to other factors or conditions, for example, the fueling device can further be allocated according to the unit price of the fuel filled by the fueling device, so as to allocate the fueling device to the vehicle more effectively and reasonably.

Based on the processing procedure as shown in FIG. 3, the processing procedure can further includes: determining the payment information corresponding to the fuel amount to be filled; and sending a message comprising the payment information or prompting the payment information to the vehicle.

With the operating principles of the system as well as the fueling control device at the vehicle side and the fueling management system at the network side therein as described above and as shown in FIG. 1, in the case of determining that the vehicle needs to be filled with fuel, the fueling control device of the vehicle obtains the driving route information and the vehicle status information of the vehicle, determines the fuel amount required by the vehicle to drive in this driving route according to the driving route information and the vehicle status information of the vehicle, and sends the determined information of the fuel amount to be filled and information of the current position of the vehicle to the fueling management system at the network side; the fueling management system allocates a fueling device to the vehicle according to the current position of the vehicle and sends the information of the fuel amount to be filled to the allocated fueling device; and the fueling device offers the corresponding fuel to the vehicle according to the information of the fuel amount to be filled, which can plan the required fuel amount for the vehicle automatically and effectively and obtain the corresponding fuel, so as to solve the problem that the filled fuel amount of the vehicle cannot be planned automatically, reasonably and effectively in the prior art.

Embodiments of the present application further provide a device for automatically fueling a vehicle.

Figure 4:
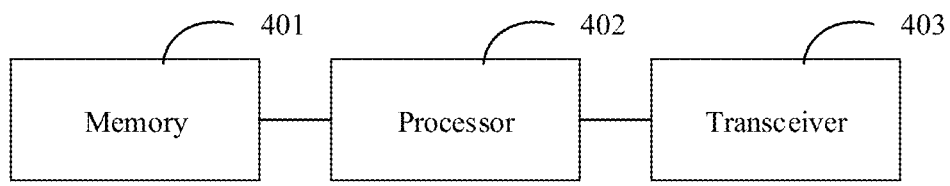
FIG. 4 is a structural block diagram of a device for automatically fueling a vehicle provided by some embodiments of the present application.

FIG. 4 shows a structural block diagram of a device for automatically fueling a vehicle provided in the embodiments of the present application, where the device is in the vehicle and includes a memory 401, a processor 402 and a transceiver 403;

the memory 401 is configured to store at least one machine executable instruction;

the processor 402 is configured to execute the at least one instruction stored in the memory 401 to: judge whether the vehicle needs to be filled with fuel; obtain driving route information and vehicle status information of the vehicle in the case of determining that the vehicle needs to be filled with fuel; determine fuel amount to be filled according to the driving route information and the vehicle status information of the vehicle; obtain a current position of the vehicle; send, through the transceiver 403, a fueling request to a fueling management system, wherein the fueling request carries an identifier of the vehicle, information of the fuel amount to be filled, and information of the current position of the vehicle; receive, through the transceiver 403, a feedback message from the fueling management system, wherein the feedback message includes position information of a fueling device; and prompt the vehicle to obtain fuel offered by the fueling device indicated by the position information of the fueling device according to the fuel amount to be filled; and the transceiver 403 is configured to receive and send information according to invoking by the processor.

In some embodiments of the present application, the processor 402 executes the at least one instruction to judge whether the vehicle needs to be filled with fuel, which includes: receive a liquid level signal from an On-board network, and determine that the vehicle needs to be filled with fuel in the case that the liquid level signal indicates that a liquid level of a fuel tank of the vehicle is lower than a predetermined liquid level; or receive through the transceiver a load signal from the On-board network, and determine that the vehicle needs to be filled with fuel in the case that the load signal indicates that deadweight of the vehicle exceeds the predetermined deadweight; or determine that the vehicle needs to be filled with fuel in the case of receiving through the transceiver a fueling indication from the outside of the vehicle.

In some embodiments of the present application, the processor 402 executes the at least one instruction to obtain the driving route information of the vehicle, which includes: determine the current position of the vehicle; judge whether the current position of the vehicle is included on a prestored driving route; in the case that the current position of the vehicle is included on the prestored driving route, if the current position of the vehicle is at one of two ends of the prestored driving route, determine the prestored driving route as the obtained driving route; if the current position of the vehicle is not at one of two ends of the prestored driving route, determine a route between the current position of the vehicle and an end of the prestored driving route in a driving direction of the vehicle as the obtained driving route according to the driving direction of the vehicle; and in the case that the current position of the vehicle is not included on the prestored driving route, obtain the driving route information of the vehicle from external resources.

In some embodiments of the present application, the processor 402 executes the at least one instruction to obtain the driving route information of the vehicle from external resources, which includes: prompt a user to input the driving route information, and receive the driving route information input by the user via an on-board HMI device or an on-board navigation device; or send a message requesting to obtain the driving route information to a client of a mobile terminal of the user, and receive the driving route information from the client of the mobile terminal of the user; or send a message requesting to obtain the driving route information to a network terminal, and receive the driving route information from the network terminal.

In some embodiments of the present application, the processor 402 executes the at least one instruction to obtain the vehicle status information of the vehicle, which includes: obtain the vehicle status information from an On-board network, wherein the vehicle status information at least includes: information of average fuel consumption per 100 kilometers, current weight and filled fuel amount of the vehicle; then the processor executes the at least one instruction to determine the fuel amount to be filled, which includes: determine a length of the driving route; determine the required fuel amount according to a function relationship among the average fuel consumption per 100 kilometers of the vehicle, the current weight of the vehicle and the length of the driving route; and determine the fuel amount to be filled according to the determined required fuel amount and the filled fuel amount of the vehicle.

In some embodiments of the present application, the processor executes the at least one instruction to further determine driving time of the vehicle; then the processor 402 executes the at least one instruction to determine the required fuel amount, which includes: determine the required fuel amount according to a function relationship among the average fuel consumption per 100 kilometers of the vehicle, the current weight of the vehicle, the length of the driving route and the driving time.

In some embodiments of the present application, the processor 402 executes the at least one instruction to further obtain weather condition information; then the processor executes the at least one instruction to determine the required fuel amount, which includes: determine the required fuel amount according to a function relationship among the average fuel consumption per 100 kilometers of the vehicle, the current weight of the vehicle, the length of the driving route and the weather condition.

In some embodiments of the present application, the processor 402 executes the at least one instruction to obtain the weather condition information, which includes: obtain the weather condition information from a weather application in a mobile device of a user; or obtain the weather condition information from a network resource, which includes a web server or a Vehicle to X (V2X) device.

In some embodiments of the present application, the processor 402 executes the at least one instruction to further obtain information of road status of the driving route, which includes at least one of: road speed limit information, road traffic control information, road closure information, road congestion information; then the processor executes the at least one instruction to determine the required fuel amount, which includes: determine the required fuel amount according to a function relationship among the average fuel consumption per 100 kilometers of the vehicle, the current weight of the vehicle, the length of the driving route and the road status of the driving route.

In some embodiments of the present application, the processor 402 executes the at least one instruction to obtain the information of the road status of the driving route, which includes: obtain the information of the road status of the driving route from a navigation device of the vehicle; or obtain the information of the road status of the driving route from an application in a mobile device of a user; or obtain the information of the road status of the driving route from a network resource, which includes a web server or an V2X device.

In some embodiments of the present application, the vehicle status information further includes: information of maximum load of the vehicle; then the processor 402 executes the at least one instruction to determine the required fuel amount, which includes: determine the required fuel amount according to a function relationship among the average fuel consumption per 100 kilometers of the vehicle, the current weight of the vehicle, the maximum load of the vehicle and the length of the driving route.

In some embodiments of the present application, the processor 402 executes the at least one instruction to further determine actual fuel consumption after each fueling in a preset update cycle; compare the required fuel amount determined each time with the actual fuel consumption; and update the function relationship for determining the required fuel amount according to a comparison result.

In some embodiments of the present application, the processor 402 executes the at least one instruction to further receive a payment message from the fueling management system, or invoke a camera of the vehicle to scan the payment information prompted by the fueling device; and make a payment according to the payment message.

Figure 5:
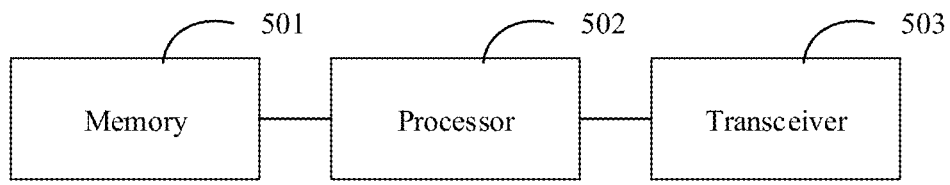
FIG. 5 is another structural block diagram of a device for automatically fueling a vehicle provided by some embodiments of the present application.

FIG. 5 shows a structural block diagram of a device for automatically fueling a vehicle provided by the embodiments of the present application, where the device is at the network side and includes a memory 501, a processor 502 and a transceiver 503; the memory 501 is configured to store at least one machine executable instruction; the processor 502 is configured to execute the at least one instruction stored in the memory 501 to: receive, through the transceiver 503, a fueling request from the vehicle, where the fueling request includes the information of fuel amount to be filled and the information of a current position of the vehicle; allocate a fueling device which conforms to a preset position rule to the vehicle according to the information of the current position of the vehicle and the preset position rule; send, through the transceiver, a feedback message carrying position information of the fueling device to the vehicle; and send, through the transceiver 503, the identifier of the vehicle and the information of the fuel amount to be filled to the fueling device so that the fueling device offers fuel to the vehicle indicated by the identifier of the vehicle according to the information of the fuel amount to be filled; and the transceiver 503 is configured to receive and send information according to invoking by the processor.

In some embodiments of the present application, the processor executes the at least one instruction to allocate the fueling device to the vehicle, which includes: obtain pre-stored positions of at least one fueling device, and allocate the fueling device which conforms to the preset position rule to the vehicle; wherein the preset position rule includes: a fueling device closest to the current position of the vehicle; or any one of at least one fueling device of which the distance from the current position of the vehicle is a preset distance; or a fueling device of a preset operator closest to the current position of the vehicle.

In some embodiments of the present application, the processor 502 executes the at least one instruction to further obtain dynamic operation condition information of each of the at least one fueling device, wherein the dynamic operation condition information includes a fueling queue length of the fueling device; then the processor 502 executes the at least one instruction to allocate the fueling device to the vehicle, which includes: allocate a fueling device which conforms to the preset position rule and of which the fueling queue length is less than a preset fueling queue length to the vehicle.

In some embodiments of the present application, the processor 502 executes the at least one instruction to further determine payment information corresponding to the fuel amount to be filled; and send, through the transceiver, a message comprising the payment information or prompting the payment information to the vehicle.

With the automatically fueling solution of the vehicle provided by the present application, in the case of determining that the vehicle needs to be filled with fuel, the fueling control device of the vehicle obtains the driving route information and the vehicle status information of the vehicle, determines the fuel amount required by the vehicle to drive in this driving route according to the driving route information and the vehicle status information of the vehicle, and sends the determined information of the fuel amount to be filled and information of the current position of the vehicle to the fueling management system at the network side; the fueling management system allocates a fueling device to the vehicle according to the current position of the vehicle and sends the information of the fuel amount to be filled to the allocated fueling device; and the fueling device offers the corresponding fuel to the vehicle according to the information of the fuel amount to be filled, which can plan the required fuel amount for the vehicle automatically and effectively and obtain the corresponding fuel, so as to solve the problem that the filled fuel amount of the vehicle cannot be planned automatically, reasonably and effectively in the prior art.

It should be understood by those skilled in the art that the embodiments of the present application can provide methods, systems and computer program products. Thus the present application can take the form of hardware embodiments alone, application software embodiments alone, or embodiments combining the application software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the invention without departing from the spirit and scope of the invention. Thus the invention is also intended to encompass these modifications and variations therein as long as these modifications and variations come into the scope of the claims of the invention and their equivalents.

What is claimed is:

1. A method for automatically fueling a vehicle, comprising:
   judging, by a fueling control device of the vehicle, whether the vehicle needs to be filled with fuel;
   obtaining driving route information and vehicle status information of the vehicle in the case of determining that the vehicle needs to be filled with fuel;
   determining fuel amount to be filled according to the driving route information and the vehicle status information of the vehicle;
   obtaining a current position of the vehicle;
   sending a fueling request to a fueling management system, wherein the fueling request carries an identifier of the vehicle, information of the fuel amount to be filled, and information of the current position of the vehicle;
   receiving a feedback message from the fueling management system, wherein the feedback message comprises position information of a fueling device; and
   prompting the vehicle to obtain fuel offered by the fueling device indicated by the position information of the fueling device according to the fuel amount to be filled, wherein obtaining the driving route information of the vehicle comprises:
   determining the current position of the vehicle;
   judging whether the current position of the vehicle is included on a prestored driving route;
   in the case that the current position of the vehicle is included on the prestored driving route, and if the current position of the vehicle is at one of two ends of the prestored driving route, determining the prestored driving route as the obtained driving route;
   if the current position of the vehicle is not at one of two ends of the prestored driving route, determining a route between the current position of the vehicle and an end of the prestored driving route in a driving direction of the vehicle as the obtained driving route according to the driving direction of the vehicle; and,
   in the case that the current position of the vehicle is not included on the prestored driving route, obtaining the driving route information of the vehicle from external resources.

2. The method according to claim 1, wherein judging whether the vehicle needs to be filled with fuel comprises:
   receiving a liquid level signal from an On-board network, and determining that the vehicle needs to be filled with fuel in the case that the liquid level signal indicates that a liquid level of a fuel tank of the vehicle is lower than a predetermined liquid level;
   receiving a load signal from the On-board network, and determining that the vehicle needs to be filled with fuel in the case that the load signal indicates that deadweight of the vehicle exceeds predetermined deadweight; or
   determining that the vehicle needs to be filled with fuel in the case of receiving a fueling indication from the outside of the vehicle.

3. The method according to claim 1, wherein obtaining the driving route information of the vehicle from external resources comprises:
   prompting a user to input the driving route information, and receiving the driving route information input by the user via an on-board Human Machine Interface (HMI) device or an on-board navigation device;
   sending a message requesting to obtain the driving route information to a client of a mobile terminal of the user, and receiving the driving route information from the client of the mobile terminal of the user; or
   sending a message requesting to obtain the driving route information to a network terminal, and receiving the driving route information from the network terminal.

4. The method according to claim 1, wherein obtaining the vehicle status information of the vehicle comprises:
   obtaining the vehicle status information from an On-board network, wherein the vehicle status information at least comprises: information of average fuel consumption per 100 kilometers, current weight and filled fuel amount of the vehicle; then
   determining the fuel amount to be filled comprises:
   determining a length of the driving route;
   determining the required fuel amount according to a function relationship among the average fuel consumption per 100 kilometers of the vehicle, the current weight of the vehicle and the length of the driving route; and
   determining the fuel amount to be filled according to the determined required fuel amount and the filled fuel amount of the vehicle.

5. The method according to claim 4, wherein the method further comprises:
   determining driving time of the vehicle;
   then, determining the required fuel amount comprises:
   determining the required fuel amount according to a function relationship among the average fuel consumption per 100 kilometers of the vehicle, the current weight of the vehicle, the length of the driving route and the driving time.

6. The method according to claim 4, wherein the method further comprises:
   obtaining weather condition information; then
   determining the required fuel amount comprises:
   determining the required fuel amount according to a function relationship among the average fuel consumption per 100 kilometers of the vehicle, the current weight of the vehicle, the length of the driving route and the weather condition.

7. The method according to claim 6, wherein obtaining the weather condition information comprises:
   obtaining the weather condition information from a weather application in a mobile device of a user; or
   obtaining the weather condition information from a network resource, which comprises a web server or a Vehicle to X (V2X) device.

8. The method according to claim 4, wherein the method further comprises:
   obtaining information of road status of the driving route, which comprises at least one of: road speed limit information, road traffic control information, road closure information, road congestion information; then
   determining the required fuel amount comprises:
   determining the required fuel amount according to a function relationship among the average fuel consumption per 100 kilometers of the vehicle, the current weight of the vehicle, the length of the driving route and the road status of the driving route.

9. The method according to claim 8, wherein obtaining the information of the road status of the driving route comprises:
   obtaining the information of the road status of the driving route from a navigation device of the vehicle;

obtaining the information of the road status of the driving route from an application in a mobile device of a user; or obtaining the information of the road status of the driving route from a network resource, which comprises a web server or an V2X device.

10. The method according to claim 4, wherein the vehicle status information further comprises:

information of maximum load of the vehicle; then determining the required fuel amount comprises:

determining the required fuel amount according to a function relationship among the average fuel consumption per 100 kilometers of the vehicle, the current weight of the vehicle, the maximum load of the vehicle and the length of the driving route.

11. The method according to claim 4, wherein the method further comprises:

determining actual fuel consumption after each fueling in a preset update cycle;

comparing the required fuel amount determined each time with the actual fuel consumption; and updating the function relationship for determining the required fuel amount according to a comparison result.

12. The method according to claim 1, wherein the method further comprises:

receiving a payment message from the fueling management system; and making a payment according to the payment message.

13. The method according to claim 1, wherein the vehicle comprises a vehicle which needs to be filled with fuel.

14. A method for automatically fueling a vehicle, comprising:

receiving, by a fueling management system, a fueling request from the vehicle, wherein the fueling request comprises an identifier of the vehicle, information of fuel amount to be filled, and information of a current position of the vehicle;

allocating a fueling device which conforms to a preset position rule to the vehicle according to the information of the current position of the vehicle and the preset position rule;

sending a feedback message carrying position information of the fueling device to the vehicle; and sending the identifier of the vehicle and the information of the fuel amount to be filled to the fueling device so that the fueling device offers fuel to the vehicle indicated by the identifier of the vehicle according to the information of the fuel amount to be filled, wherein allocating the fueling device to the vehicle comprises:

obtaining prestored positions of at least one fueling device, and allocating the fueling device which conforms to the preset position rule to the vehicle;

obtaining dynamic operation condition information of each of the at least one fueling device, wherein the dynamic operation condition information comprises a fueling queue length of the fueling device; and allocating a fueling device which conforms to the preset position rule and of which the fueling queue length is less than a preset fueling queue length to the vehicle;

wherein the preset position rule comprises:

a fueling device closest to the current position of the vehicle;

any one of at least one fueling device of which a distance from the current position of the vehicle is a preset distance; or a fueling device of a preset operator closest to the current position of the vehicle.

15. The method according to claim 14, wherein the method further comprises:

determining payment information corresponding to the fuel amount to be filled; and sending a message comprising the payment information or prompting the payment information to the vehicle.

16. A device for automatically fueling a vehicle, the device located in the vehicle and comprising a memory, a processor and a transceiver; wherein:

the memory is configured to store at least one machine executable instruction;

the processor is configured to:

execute the at least one instruction stored in the memory to: judge whether the vehicle needs to be filled with fuel;

obtain driving route information and vehicle status information of the vehicle in the case of determining that the vehicle needs to be filled with fuel;

determine fuel amount to be filled according to the driving route information and the vehicle status information of the vehicle;

obtain a current position of the vehicle;

send, through the transceiver, a fueling request to a fueling management system, wherein the fueling request carries an identifier of the vehicle, information of the fuel amount to be filled, and information of the current position of the vehicle;

receive, through the transceiver, a feedback message from the fueling management system, wherein the feedback message comprises position information of a fueling device; and prompt the vehicle to obtain fuel offered by the fueling device indicated by the position information of the fueling device according to the fuel amount to be filled; and the transceiver is configured to receive and send information according to invoking by the processor, wherein obtaining the driving route information of the vehicle comprises:

determining the current position of the vehicle;

judging whether the current position of the vehicle is included on a prestored driving route;

in the case that the current position of the vehicle is included on the prestored driving route, and if the current position of the vehicle is at one of two ends of the prestored driving route, determining the prestored driving route as the obtained driving route;

if the current position of the vehicle is not at one of two ends of the prestored driving route, determining a route between the current position of the vehicle and an end of the prestored driving route in a driving direction of the vehicle as the obtained driving route according to the driving direction of the vehicle; and, in the case that the current position of the vehicle is not included on the prestored driving route, obtaining the driving route information of the vehicle from external resources.

17. A system for automatically fueling a vehicle, the system comprising a fueling control device in the vehicle, a fueling management system at a network side and a fueling device; wherein:

the fueling control device of the vehicle is configured to: judge whether the vehicle needs to be filled with fuel;

obtain driving route information and vehicle status information of the vehicle in the case of determining that the vehicle needs to be filled with fuel;

determine fuel amount to be filled according to the driving route information and the vehicle status information of the vehicle;

obtain a current position of the vehicle;

send a fueling request to the fueling management system, wherein the fueling request carries an identifier of the vehicle, information of the fuel amount to be filled, and information of the current position of the vehicle;

receive a feedback message from the fueling management system, wherein the feedback message comprises position information of the fueling device; and prompt the vehicle to obtain fuel offered by the fueling device indicated by the position information of the fueling device according to the fuel amount to be filled, wherein obtaining the driving route information of the vehicle comprises:

determining the current position of the vehicle;

judging whether the current position of the vehicle is included on a prestored driving route;

in the case that the current position of the vehicle is included on the prestored driving route, and if the current position of the vehicle is at one of two ends of the prestored driving route, determining the prestored driving route as the obtained driving route;

if the current position of the vehicle is not at one of two ends of the prestored driving route, determining a route between the current position of the vehicle and an end of the prestored driving route in a driving direction of the vehicle as the obtained driving route according to the driving direction of the vehicle; and, in the case that the current position of the vehicle is not included on the prestored driving route, obtaining the driving route information of the vehicle from external resources;

the fueling management system is configured to:

receive the fueling request from the vehicle; allocate the fueling device which conforms to a preset position rule to the vehicle according to the information of the current position of the vehicle and the preset position rule;

send a feedback message carrying information of the fueling device to the vehicle; and send the identifier of the vehicle and the information of the fuel amount to be filled to the fueling device so that the fueling device offers fuel to the vehicle according to the information of the fuel amount to be filled; and the fueling device is configured to:

receive the identifier of the vehicle and the information of the fuel amount to be filled from the fueling management system; and offer the fuel corresponding to the fuel amount to be filled to the vehicle indicated by the identifier of the vehicle.

18. A method for automatically fueling a vehicle, comprising:

judging, by a fueling control device of the vehicle, whether the vehicle needs to be filled with fuel;

obtaining driving route information and vehicle status information of the vehicle in the case of determining that the vehicle needs to be filled with fuel;

determining fuel amount to be filled according to the driving route information and the vehicle status information of the vehicle;

obtaining a current position of the vehicle;

sending a fueling request to a fueling management system, wherein the fueling request carries an identifier of the vehicle, information of the fuel amount to be filled, and information of the current position of the vehicle;

receiving a feedback message from the fueling management system, wherein the feedback message comprises position information of a fueling device; and prompting the vehicle to obtain fuel offered by the fueling device indicated by the position information of the fueling device according to the fuel amount to be filled, wherein obtaining the vehicle status information of the vehicle comprises:

obtaining the vehicle status information from an On-board network, wherein the vehicle status information at least comprises: information of average fuel consumption per 100 kilometers, current weight and filled fuel amount of the vehicle; then determining the fuel amount to be filled comprises:

determining a length of the driving route;

determining the required fuel amount according to a function relationship among the average fuel consumption per 100 kilometers of the vehicle, the current weight of the vehicle and the length of the driving route; and determining the fuel amount to be filled according to the determined required fuel amount and the filled fuel amount of the vehicle.

19. The method according to claim 18, further comprising:

determining driving time of the vehicle;

then, determining the required fuel amount comprises:

determining the required fuel amount according to a function relationship among the average fuel consumption per 100 kilometers of the vehicle, the current weight of the vehicle, the length of the driving route and the driving time.

20. The method according to claim 18, further comprising:

obtaining weather condition information; then determining the required fuel amount comprises:

determining the required fuel amount according to a function relationship among the average fuel consumption per 100 kilometers of the vehicle, the current weight of the vehicle, the length of the driving route and the weather condition.

21. The method according to claim 20, wherein obtaining the weather condition information comprises:

obtaining the weather condition information from a weather application in a mobile device of a user; or obtaining the weather condition information from a network resource, which comprises a web server or a Vehicle to X (V2X) device.

22. The method according to claim 18, further comprising:

obtaining information of road status of the driving route, which comprises at least one of: road speed limit information, road traffic control information, road closure information, road congestion information; then determining the required fuel amount comprises:

determining the required fuel amount according to a function relationship among the average fuel consumption per 100 kilometers of the vehicle, the current weight of the vehicle, the length of the driving route and the road status of the driving route.

* * * * *